US008688064B2

(12) United States Patent
Anandakumar et al.

(10) Patent No.: US 8,688,064 B2
(45) Date of Patent: *Apr. 1, 2014

(54) LOW-COMPLEXITY DIVERSITY RECEPTION

(75) Inventors: Anand K. Anandakumar, San Diego, CA (US); Curtis Ling, Carlsbad, CA (US); Sugbong Kang, San Diego, CA (US)

(73) Assignee: MaxLinear, Inc., Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/556,649

(22) Filed: Jul. 24, 2012

(65) Prior Publication Data

US 2012/0289177 A1 Nov. 15, 2012

Related U.S. Application Data

(63) Continuation of application No. 12/966,905, filed on Dec. 13, 2010, which is a continuation-in-part of application No. 12/247,908, filed on Oct. 8, 2008, now Pat. No. 8,010,070.

(60) Provisional application No. 61/285,945, filed on Dec. 11, 2009, provisional application No. 60/978,645, filed on Oct. 9, 2007.

(51) Int. Cl.
*H04B 1/16* (2006.01)

(52) U.S. Cl.
USPC ............ 455/207; 455/333; 455/334; 375/267

(58) Field of Classification Search
USPC ........ 455/207–209, 230, 232.1, 234.1, 240.1, 455/323, 333, 334, 338–341; 375/260, 267
See application file for complete search history.

(56) References Cited

U.S. PATENT DOCUMENTS

| 7,729,432 | B2* | 6/2010 | Khan et al. ................. 375/260 |
| 8,010,070 | B2* | 8/2011 | Anandakumar et al. ...... 455/207 |
| 8,213,530 | B2* | 7/2012 | Lee et al. ................... 375/267 |
| 2004/0001554 | A1* | 1/2004 | Sun et al. .................... 375/260 |
| 2008/0075209 | A1 | 3/2008 | Li |
| 2009/0207927 | A1 | 8/2009 | Watanabe |
| 2012/0294399 | A1* | 11/2012 | Anandakumar et al. ...... 375/349 |

OTHER PUBLICATIONS

Ling, C., et al., "Low-Complexity Antenna Diversity Receivers for Mobile Wireless Applications," Wireless Personal Communications 14: 65-81, 2000 (9 pages).

* cited by examiner

Primary Examiner — Nhan Le
(74) Attorney, Agent, or Firm — McAndrews, Held & Malloy, Ltd.

(57) ABSTRACT

A receiver may comprise a plurality of signal processing paths, a bin-wise combiner, and an inverse transformation block. Each signal processing path may comprise a transformation block that is operable to transform a time-domain digital signal to an associated frequency-domain signal having a plurality of subband signals. The bin-wise combiner may be operable to combine corresponding subband signals of the plurality of signal processing paths. The inverse transformation block may be operable to transform output of the bin-wise combiner to an associated time-domain signal. The transformation block in each said signal processing path may be a Fast Fourier Transform (FFT) block. The number of points used by the FFT block of any one of said plurality of signal processing paths may be based on the delay spread of a signal input to the one of the signal processing paths.

22 Claims, 4 Drawing Sheets

LOW-COMPLEXITY DIVERSITY RECEPTION

CLAIM OF PRIORITY

The present application is a continuation of U.S. application Ser. No. 12/966,905 filed Dec. 13, 2010. U.S. application Ser. No. 12/966,905 claims benefit under 35 USC 119(e) of U.S. provisional application No. 61/285,945, filed Dec. 11, 2009. U.S. application Ser. No. 12/966,905 is also a continuation-in-part of U.S. application Ser. No. 12/247,908 filed Oct. 8, 2008, now patented as U.S. Pat. No. 8,010,070. U.S. application Ser. No. 12/247,908 claims benefit under 35 USC 119(e) of U.S. provisional application No. 60/978,645, filed Oct. 9, 2007.

Each of the above applications is hereby incorporated herein by reference in its entirety.

TECHNICAL FIELD

Aspects of the present application relate to electronic communications. More specifically, to Low-Complexity Diversity Reception.

BACKGROUND

Conventional antenna diversity systems typically use one receiver path for each antenna present in the system. A receiver 100 with a three-antenna diversity receiver path is shown in FIG. 1. Receiver 100 is shown as including receiver paths 120, 140 and 160. Each receiver path is shown as including a low-noise amplifier, a frequency conversion module, one or more filters, a variable gain amplifier, collectively forming an analog front end and a baseband processor. For example, as illustrated in FIG. 1, receiver path (alternatively referred to as channel) 120 is shown as including an analog front-end 125 and a baseband processor 120. Analog front end is shown as including a low-noise amplifier 102, a frequency conversion module 104, such as a mixer, one or more filters 106, 108, and a variable gain amplifier 110.

As shown in FIG. 2, the three-antenna diversity receiver 100 is shown as including three receivers that are coupled to their associated baseband processors. In each receiver path, e.g., receiver path 120, the signal enters an RF analog front end, e.g., 125, where the signal is amplified, filtered and downconverted prior to being digitized as a baseband signal. The output signals CSi, where i is an integer varying from 1 to 3 of the baseband processors 165, 175, and 185 are combined by combiner 190 in such a way as to optimize signal quality using any one of a number of conventional algorithms, such as simple switched diversity algorithm; or optimal combining algorithm according to which the signals from each diversity channel are cophased and summed; or interference cancellation algorithm in accordance with which the signals are combined in such a way as to reduce cochannel interference (CCI). As is known, CCI degrades quality of the desired signal. A full diversity receiver such as that shown in FIG. 1 enables the component signals to be individually equalized. That is, a frequency-dependent phase and amplitude can be applied across the frequency components of each diversity signal before such signals are combined by combiner 190. However, such diversity systems require full receiver and baseband signal paths for each antenna disposed in the system.

A technique for low-complexity antenna diversity is described in an article entitled "Low-Complexity Antenna Diversity Receivers for Mobile Wireless Applications," by Zhang, C. N., Ling, C. C., International Journal on Wireless Personal Communications, pp. 65-8. The authors show the viability of combining diversity antenna signals using front-end analog circuits to achieve significant diversity gain in comparison to conventional diversity techniques that require duplicate signal paths and modems. The technique described in the article provides hardware savings by eliminating one of the modems. Furthermore, since each antenna is receiving the same desired channel, the need for duplicate local oscillator is eliminated. Likewise, channel selection filters, amplifiers and data conversion hardware, can be shared.

Patent application Ser. No. 11/874,854, filed Oct. 18, 2007, and patent application No. 60/862,193, filed Oct. 19, 2006, both entitled "Low Complexity Antenna Diversity", and the contents of which are incorporated herein by reference in their entirety, disclose a diversity combining receiver which combines the diversity signals prior to baseband and demodulator processing, as shown in FIG. 2.

The signals from the various channels are combined using either maximum ratio combining (MRC) technique or simple cophasing technique. In a conventional MRC technique, which accounts for both the phase and the signal-to-noise ratio for each channel, the entire signal is treated as a single band. In a conventional single-band MRC, as shown in FIG. 2, the signal received by each antenna is delivered to an associated analog front end $AF_i$ component, where i is an index of the diversity channel. One advantage of the single-band MRC technique is that it achieves significant diversity gain while requiring relatively low complexity. However, when the wireless channel through which the received signals pass has frequency-selective fading (which can be described by well-known channel models such as the 6-path Typical Urban 6 (TU-6)), the conventional single-band MRC technique may not provide as large a diversity gain as a conventional diversity receiver. For example, a two-branch diversity system using single-band MRC may only provide, for example, 2.5 dB of diversity gain compared with a conventional diversity receiver which may provide, for example, 8 dB of diversity gains. A conventional diversity receiver uses two full receivers and has double the cost, power and size of a single-band MRC.

BRIEF SUMMARY OF THE INVENTION

A wireless diversity receiver, in accordance with one embodiment of the present invention includes, in part, N signal processing paths, a bin-wise combiner, and an inverse transformation module. Each signal processing path includes, in part, a mixer adapted to downconvert a frequency of an RF signal received by that path, an analog-to-digital converter adapted to convert the downconverted signal from an analog signal to a digital signal, and a transformation block adapted to transform the digital signal represented in time domain to an associated frequency domain signal having M subband signals. The bin-wise combiner is configured to combine the corresponding subband signals of the N paths. The inverse transformation block is configured to transform the output of the bin-wise combiner to an associated time-domain signal.

In some embodiments, each signal path further includes, in part, an amplifier adapted to amplify the RF signal received by that path. In one embodiment, the amplifier is a low-noise amplifier. In one embodiment, the transformation block in each path is a Fourier transformation block. In one embodiment, the wireless diversity receiver further includes a filter responsive to the inverse transformation block, and a variable gain stage responsive to the filter.

In accordance with another embodiment of the present invention, a method of processing signals in a wireless receiver having N signal processing paths, includes, in part, downconverting an RF signal received in each path, converting each downconverted analog RF signal to an associated digital signal, transforming each digital signal represented in time domain to an associated frequency domain signal having M subband signals, combining a plurality of the subband signals of each of the paths, and performing an inverse transformation to transform the combined subband signals to an associated time-domain signal.

In one embodiment, the method further includes, in part, amplifying the RF signal received in each path. In one embodiment, the amplification in each path is performed by a low-noise amplifier. In one embodiment, the method further includes, in part, transforming each digital signal represented in time domain to an associated frequency domain signal using a Fourier transform module. The method may further include filtering the time domain signal that is generated by performing the inverse transformation, and varying the gain of an amplification stage that amplifies the filtered signal.

DETAILED DESCRIPTION

A low-complexity diversity receiver, in accordance with one embodiment of the present invention, is simple, low-cost method and has an enhanced performance in channels with relatively narrow coherence bandwidths. The performance of a low-complexity diversity receiver, in accordance with the present invention, is comparable to the performance of conventional diversity receivers that use a complete and full receive paths for each branch of the diversity.

In accordance with the one embodiment of the present invention, the receiver band is amplified, frequency downconverted, converted to a digital signal, and then divided into several subbands using, for example, a Fast Fourier Transform (FFT) module disposed in each of the complex diversity paths. In one embodiment, cophasing may be used to account for differences in the phases of various subbands. In another embodiment, maximum ratio combining (MRC) may be used to account for differences in both phases and signal-to-noise (SNR) ratios of the subbands. The subbands are scaled by their respective SNR to enable the application of MRC of the individual subbands. The resulting complex signal is delivered to an Inverse Fast Fourier Transform (IFFT) module to generate an output signal in time-domain.

Figure 3:
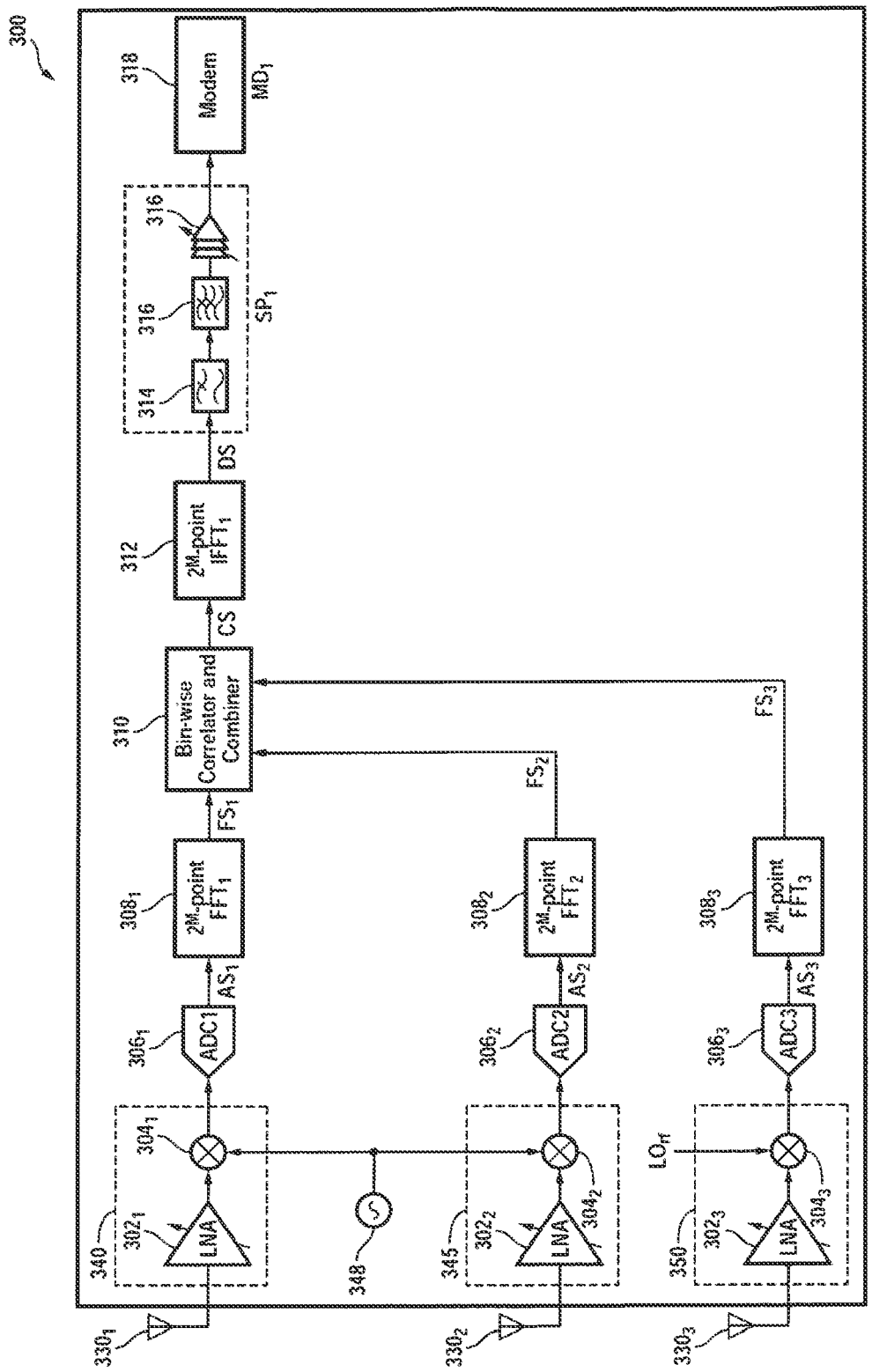
FIG. 3 is a block diagram of a low-complexity diversity receiver, in accordance with one exemplary embodiment of the present invention.

FIG. 3 is a block diagram of a three-antenna diversity receiver 300, in accordance with one exemplary embodiment of the present invention. Although receiver 300 is shown as including three paths (channels), namely paths 340, 345 and 350, it is understood that a diversity receiver, in accordance with the present invention, may have any number of paths. Path 340 is shown as including an amplifier $302_1$, a frequency conversion module $304_1$, and an analog-to-digital converter $306_1$. Path 345 is shown as including an amplifier $302_2$, a frequency conversion module $304_2$, and an analog-to-digital converter $306_2$. Path 350 is shown as including an amplifier $302_3$, a frequency conversion module $304_3$, and an analog-to-digital converter $306_3$.

Each amplifier $302_i$, where i is an index ranging from 1 to 3, is configured to receive and amplify an input signal received from an associated antenna $330_i$. In one embodiment, each amplifier $302_i$ may be a Low Noise Amplifier (LNA). In another embodiment, each amplifier $302_i$ may be a variable gain amplifier. Amplifier $302_i$ may be configured as a single-stage or multi-stage amplifier.

Figure 1:
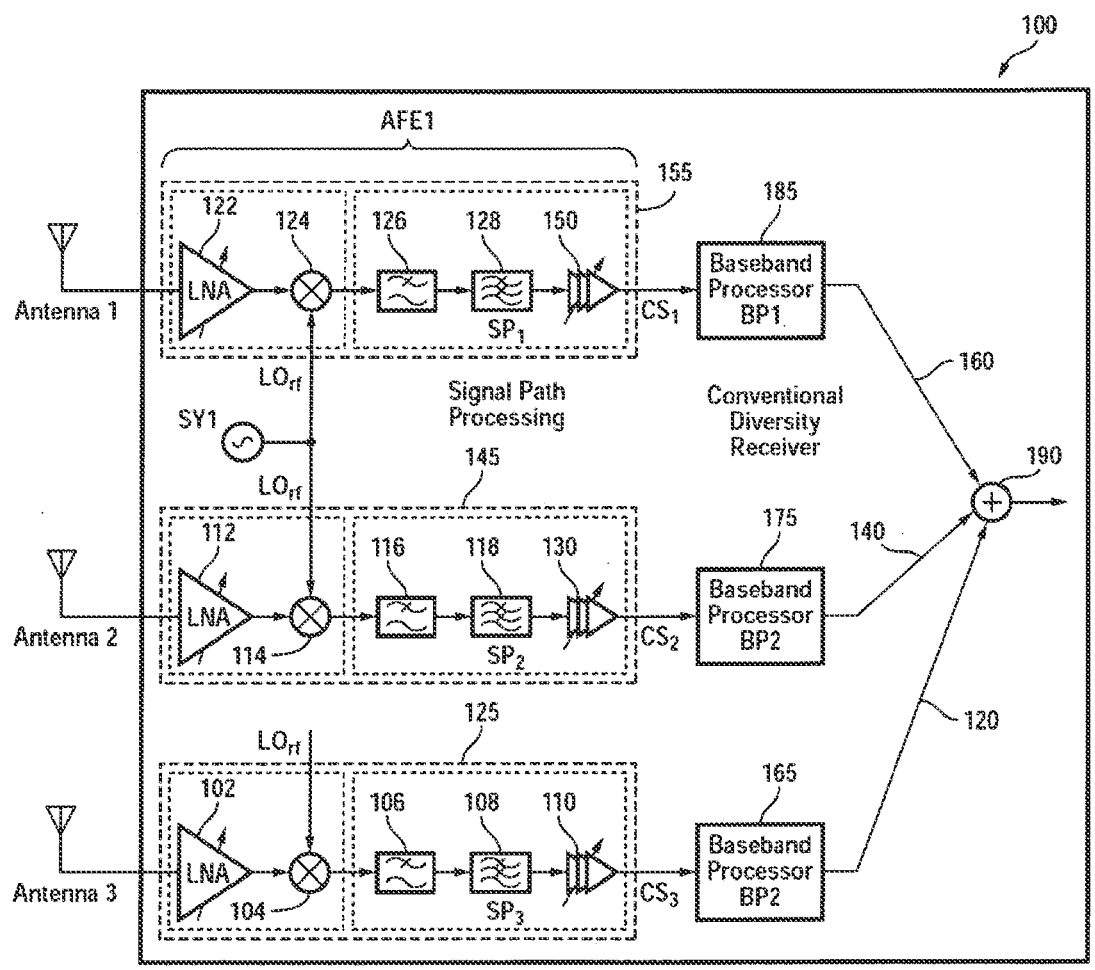
FIG. 1 is a block diagram of a diversity receiver, as known in the prior art.
Figure 2:
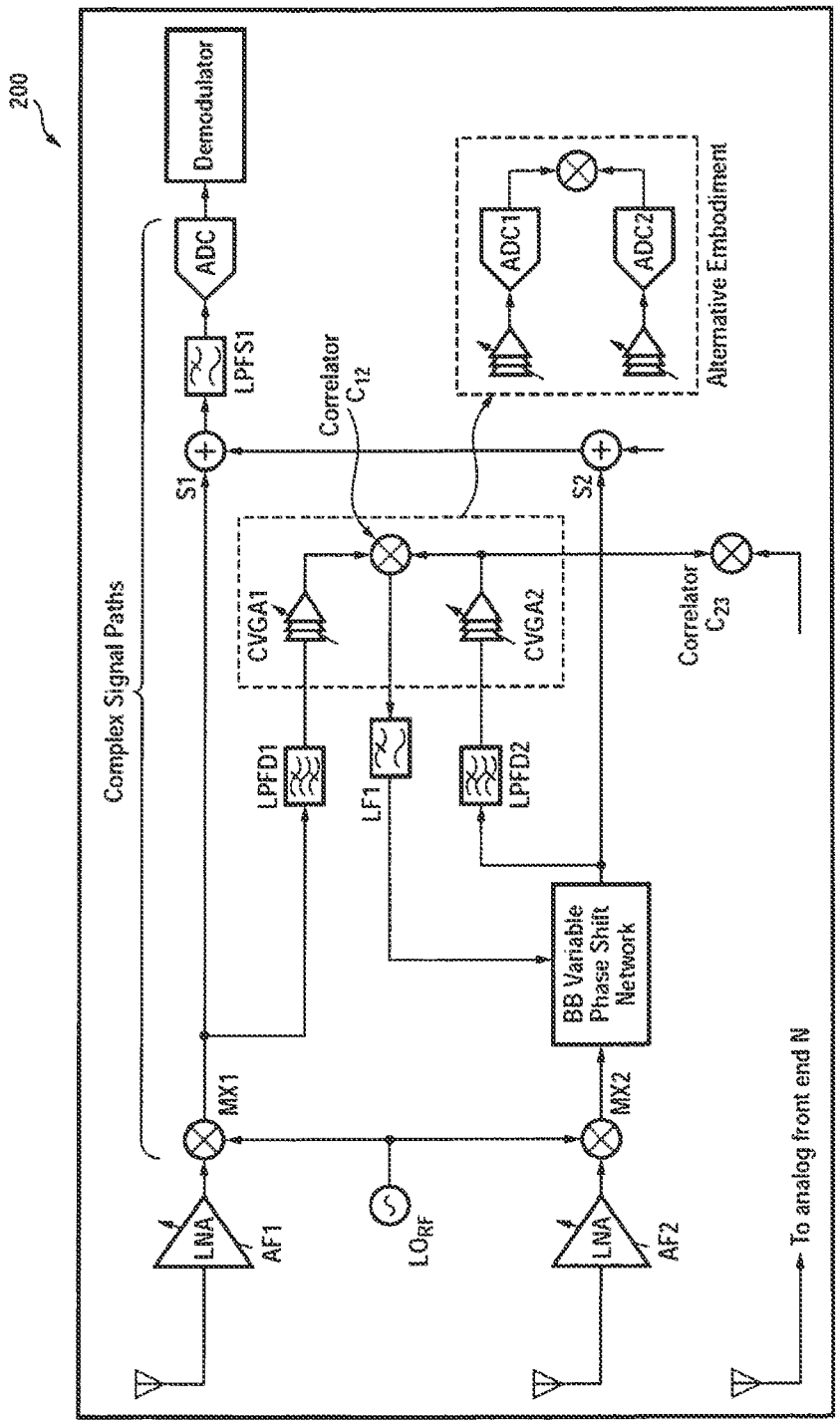
FIG. 2 is a block diagram of a low-complexity diversity receiver.

The output signal of amplifier 302 is shown as being applied to an associated frequency conversion module 304. Frequency conversion modules 12 and 22 are shown as being mixers in exemplary embodiment of FIG. 2. Each mixer 304 is configured to frequency down-convert the received signal using the oscillating signal generated by local oscillator 348. The signal whose frequency is down converted by mixer $304_i$ is converted to a digital signal by analog-to-digital (ADC) converter $306_i$. FFT module $308_i$ transforms the time-domain digitized signal into a frequency domain using $2^m$ points, as described further below.

Assume that the bandwidth of the signals $AS_i$ supplied by ADC $306_i$ is BW. For a particular wireless channel, the frequency selectivity has a coherence bandwidth CBW, which is the frequency bandwidth across which the channel can be approximated as a flat channel. CBW is inversely proportional to the delay spread of the channel. The delay spread can, in turn, be extracted from the channel's impulse response. Parameter K which is defined by rounding the ratio (BW/CBW) provides a guideline for the number of points the FFT $3080_i$ may require, by choosing the smallest m such that $2^m >= K$.

The bin (or subband) output signals $FS_i$ of the associated FFT modules $308_i$ may be combined after cophasing or combined using MRC, hence referred to herein to as subband MRC. The SNR of each subband may be estimated using any one of a number of conventional techniques to implement MRC. For example, relative subband amplitude combined with gain information available in the analog front end may be used to provide subband-wise signal strength information. The resulting signal CS1 is transformed back to time domain by IFFT module 312. The output of IFFT module 310 is filtered by lowpass filters 314, 316, and amplified by variable gain stage 316. The output of variable gain stage 316 is applied to modem 318.

As shown in FIG. 3, bin-wise combiner 310 combines the output signals of FFT modules 3081, 3082 and 3083 to generate signal CS. The combined signal CS is, in turn, applied to IFFT 310 which generates signal DS by transforming signal CS from frequency domain to time domain. The parameter m, which is the number of points used in FFT modules 308i, may be selected independently from the type of signal modulation being received. For example, an OFDM system may have 4096 subbands and, during demodulation, requires a 4096-point FFT. In accordance with the present invention, a significantly smaller FFT module is used to perform the diversity processing, thus greatly reducing complexity and power consumption. The present invention may be equally applied to non-OFDM signals (e.g. single-carrier or CDMA signals) with relatively the same degree of effectiveness.

The diversity scheme can, as with the single-band MRC diversity technique, be used without special control signals from or modifications in a modem. As such, embodiments of the present invention may be implemented with a stand-alone front end, or, for example with a radio modem which can be augmented for diversity with the addition of a radio. Some exemplary embodiments are shown in FIGS. 4a and 4b.

Figure 4A:
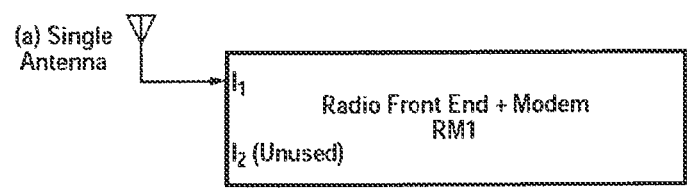
FIG. 4A shows a radio modem embodying a low-complexity diversity receiver, in accordance with one embodiment of the present invention, and used in a first configuration.
Figure 4B:
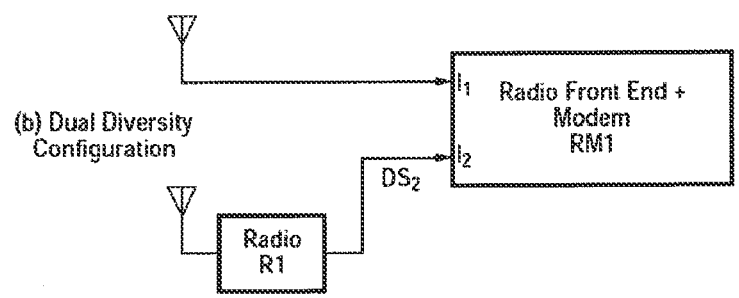
FIG. 4B shows a radio modem embodying a low-complexity diversity receiver, in accordance with one embodiment of the present invention, and used in a second configuration.

FIG. 4(a) shows a radio modem RM1 adapted to embody a low-complexity diversity receiver, in accordance with one embodiment of the present invention. Input terminal I2, shown as not being used, may be an analog or a digital input which can take analog or digital In-phase (I) and Quadrature (Q) complex baseband inputs similar to signals received or generated by ADC $306_i$ shown in FIG. 3. In the dual diversity configuration shown in FIG. 4(b), radio R1 provides a complex analog or digital I/Q output signal DS2 that is applied to input terminal I2 of RM1.

One advantage of a diversity receiver that embodies the present invention is that it allows a single integrated circuit with a relatively small additional complexity to be used both for single-antenna systems and, with the addition of a radio R1, for multiple-diversity antenna systems without commensurate increase in the system complexity. Radio R1 may be used both for single-antenna applications and diversity applications. Parameter M which defines the number of FFT points may be selected in accordance with the value of coherence bandwidth CBW of the wireless channel.

In some embodiments, transformation techniques other than FFT may be used. For examples, in some embodiments, a Hadamard transformation may be used. In some embodiments, a flexible implementation may use a filterbank such as QMF.

The present invention provides a number of advantages. A diversity receiver, in accordance with the present invention, provides performance benefits approaching that of a conventional diversity receiver but without increased complexity. The performance of a system embodying the present invention may be traded off in a scalable fashion with its complexity. Furthermore, a diversity receiver in accordance with the present invention, may be used to achieve diversity for any standards, including standards that are not based on OFDM.

The above embodiments of the present invention are illustrative and not limiting. Various alternatives and equivalents are possible. The invention is not limited by the number of subbands disposed in the diversity receiver. The invention is not limited by the type of integrated circuit in which the present disclosure may be disposed. Nor is the disclosure limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

What is claimed is:

1. A receiver comprising:
    a plurality of signal processing paths, each signal processing path comprising a transformation block that is operable to transform a time-domain digital signal to an associated frequency-domain signal having a plurality of subband signals;
    a bin-wise combiner operable to combine corresponding subband signals of the plurality of signal processing paths; and
    an inverse transformation block operable to transform output of the bin-wise combiner to an associated time-domain signal.

2. The receiver of claim 1 wherein said transformation block in each said signal processing path is a Fast Fourier Transform (FFT) block.

3. The receiver of claim 2 wherein the number of points used by said FFT block of any one of said plurality of signal processing paths is based on the delay spread of a signal input to said one of said plurality of signal processing paths.

4. The receiver of claim 3, wherein:
    said signal input to said one of said signal processing paths has a bandwidth BW;
    said signal input to said one of said signal processing paths has a coherence bandwidth of CBW; and
    said number of points used by said FFT block of said one of said signal processing paths is based on the ratio BW/CBW.

5. The receiver of claim 3, wherein:
    said signal input to said one of said signal processing paths is an orthogonal frequency division multiplexed (OFDM) signal;
    said signal input to said one of said signal processing paths consists of X bands, where X is an integer; and
    said number of points used by said FFT block is less than X.

6. The receiver of claim 1 wherein said inverse transformation block is an Inverse Fast Fourier Transform (IFFT) block.

7. The receiver of claim 1 wherein:
    said receiver comprises an analog-to-digital converter (ADC); and
    said time-domain digital signal is generated by said ADC digitizing an analog signal.

8. The receiver of claim 7, wherein:
    said receiver comprises a downconverter; and
    said time-domain digital signal is generated by said downconverter downconverting an RF signal to generate said analog signal.

9. The receiver of claim 1, wherein said transformation block comprises a bank of filters.

10. The receiver of claim 1, wherein said bin-wise combiner is operable to perform cophasing.

11. The receiver of claim 1, wherein said bin-wise combiner is operable to perform maximal ratio combining (MRC).

12. A method of processing signals in a receiver having a plurality of signal processing paths, the method comprising:
    transforming a first time-domain signal to a first frequency-domain signal, said first frequency-domain signal comprising a plurality of first subband signals;
    transforming a second time-domain signal to a second frequency-domain signal, said second frequency-domain signal comprising a plurality of second subband signals;
    combining each of said plurality of first subband signals with a corresponding one of said plurality of second subband signals, resulting in a third frequency-domain signal comprising a plurality of combined subband signals; and
    performing an inverse transformation to transform said third frequency-domain signal to an associated time-domain signal.

13. The method of claim 12 wherein said transforming comprises performing a Fast Fourier Transform (FFT).

14. The method of claim 13 wherein:
    the number of points used in said performing said FFT on said first time-domain signal is based on the delay spread of at least one of said first time-domain signal and said second time-domain signal;
    the number of points used in said performing said FFT on said second time-domain signal is based on the delay spread of at least one of said first time-domain signal and said second time-domain signal.

15. The method of claim 14 wherein:

said first time-domain signal has a bandwidth BW;

said first time-domain signal has a coherence bandwidth of CBW; and said number of points used in performing said FFT on said first time-domain signal is based on the ratio BW/CBW.

16. The method of claim 14 wherein:

said first time-domain signal is an orthogonal frequency division multiplexed (OFDM) signal;

said first time-domain signal consists of X bands, where X is an integer; and said number of points used in performing said FFT on said first time-domain signal is less than X.

17. The method of claim 12 wherein said inverse transformation is an Inverse Fast Fourier Transform (IFFT).

18. The method of claim 12 comprising digitizing an analog signal to generate said first time-domain signal.

19. The method of claim 18, comprising downconverting an RF signal to generate said analog signal.

20. The method of claim 12, wherein said inverse transformation is performed via a bank of filters.

21. The method of claim 12, wherein said combining comprises cophasing.

22. The method of claim 12, wherein said combining comprises Maximal Ratio Combining (MRC).

* * * * *